Sept. 4, 1928.  
M. HARRIS  
1,682,786  
CONNECTER FOR SPRING BRAKES  
Original Filed Sept. 3, 1925
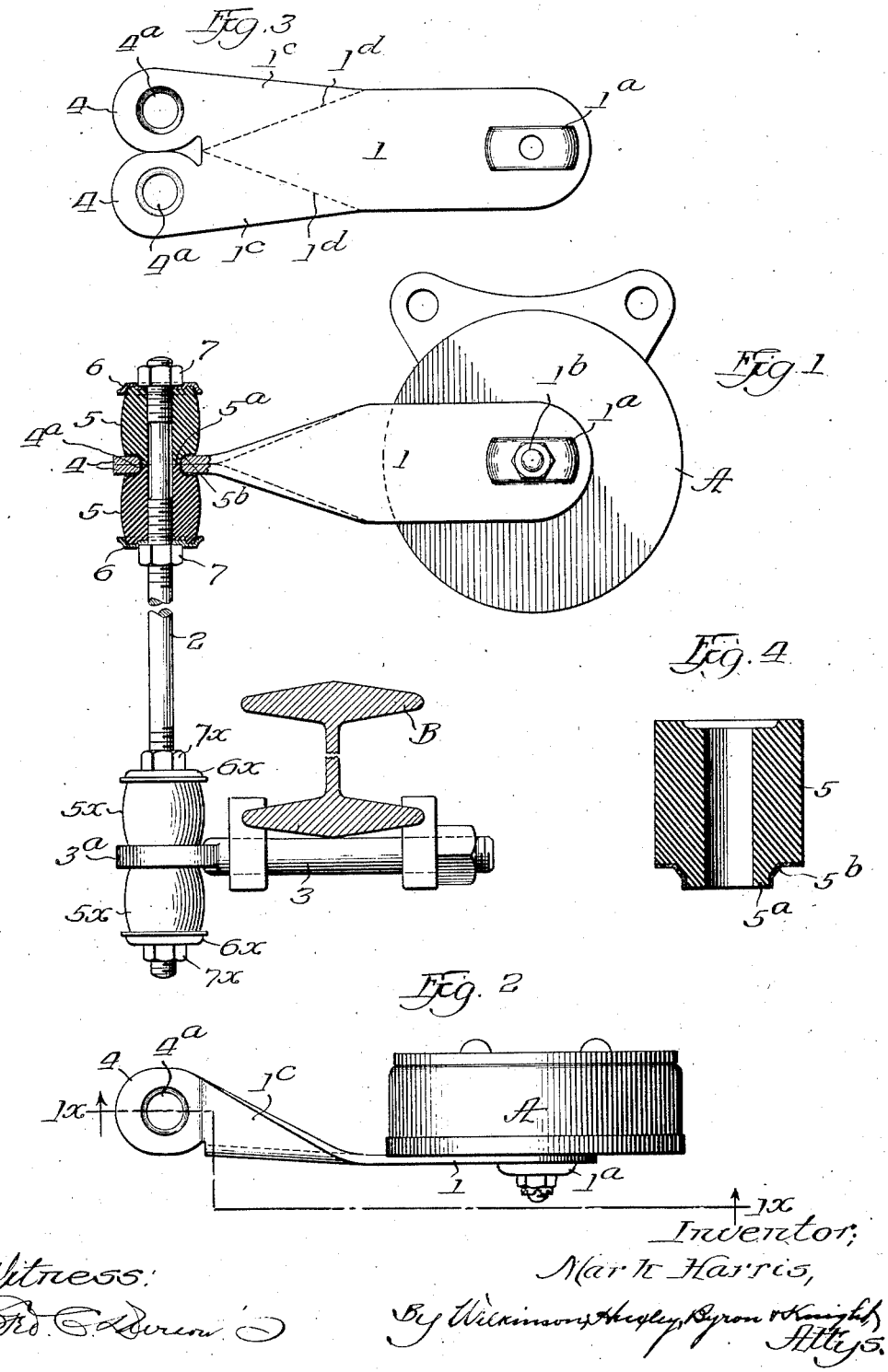

Patented Sept. 4, 1928.

1,682,786

UNITED STATES PATENT OFFICE.

MARK HARRIS, OF BIRMINGHAM, MICHIGAN, ASSIGNOR TO AMERICAN STEEL FOUNDRIES, OF CHICAGO, ILLINOIS, A CORPORATION OF NEW JERSEY.

CONNECTER FOR SPRING BRAKES.

Application filed September 3, 1925, Serial No. 54,227. Renewed April 14, 1928.

This invention relates to a device in the nature of a snubber or shock absorber to be introduced between the body frame and the chassis frame of a road vehicle, for the purpose of resisting violence in action of the vehicle springs, under the influence of surface irregularities; and particularly to spring brakes of the kind which embody in their organization two relatively rotatable frictional members, one of which is mounted, for instance, upon the body frame, and the other of which is controlled by a crank arm connected, for instance, to the chassis frame in a manner to develop a swinging motion in the crank arm from the relative movement between the said frame members.

One object of the present invention is to provide improved means to establish an angularly flexible articulation between the free end of the crank arm and the connecting rod which unites it with the chassis frame or vehicle member, and which may be used also, if desired, in articulating with necessary angular flexibility, said connecting rod with the bracket on the chassis frame; which articulating means will embody the characteristics of a wrist bearing of a shock absorbing nature, free from wear of metal upon metal, and, therefore, exempting the use of lubricant, and which will be of simple construction, convenient assembly, and readily adjustable in use.

Accordingly, the present invention proceeds upon the principle of receiving the connecting rod in the crank arm or bracket which is to be articulated, through the medium of a relatively large eye or opening, and mounting upon the rod on opposite sides of the eye through which it passes, blocks which are preferably of rubber or other shock absorbing material, having reduced portions which enter between the rod and the surrounding wall of the eye, to space the metals apart, and confined between abutments on the rod, having screw-threaded adjustment which permits the blocks to be pressed together against the eye member; the preferred design of the blocks being such that together they form a wrist bearing for the eye member, and the compressibility of the blocks insuring the characteristic of angular flexibility of the articulation; and one part of the invention consists in articulating means embodying some or all of these characteristics.

Another object of the invention is to provide an improved construction of crank arm adapted to serve the purposes above set forth, and particularly for articulation with the connecting rod in the manner herein described; accordingly, another part of the invention consists in forming a crank arm out of a plate metal blank having at one end suitable means, preferably a struck-up boss, through which to establish driving connection with the friction member that is to be rotated, and having its other end bifurcated and formed with a pair of eye openings in such relation that when bifurcations of the end of the blank are folded upon diagonal lines, into a plane perpendicular to that of the body of the blank, the ends of the bifurcations will be brought into parallelism as a reinforced or two-ply crank-end with the required articulating eye; while the folded portions of the blank adjacent the bifurcated ends will constitute strut-like flanges tapering in depth to the body of the blank, and diverging from the perforated end in a manner to strongly brace the latter, and provide a relatively rigid member of very cheap, and very light construction.

In order that the invention may be fully understood, a preferred embodiment thereof will be described in detail with reference to th accompanying drawing. In said drawing, Figure 1 is a view mainly in elevation, but partly in section, on the line $1^x$—$1^x$ of Figure 2, showing a vehicle brake embodying the several features of the invention;

Figure 2 is a top plan view of the braking device and its crank arm;

Figure 3 is a plan view of the blank from which the crank arm is to be formed; and Figure 4 is a detail view on an enlarged scale and in axial section, of one of the two identical rubber blocks employed in establishing the articulation.

A represents a spring brake or shock absorber of the drum and rotary friction shoe type, and B represents a chassis frame relative to which the brake is moved during the action of the springs of the vehicle upon which the brake is mounted. 1 represents a crank arm or load transmitting member which extends radially from the brake A and which is to be assumed to be connected in driving relation with the rotating member of the brake, at the radius center of the crank, for instance, through means of the struck-up boss 1ª and the nut 1ᵇ. 2 represents a connecting rod or member serving the purpose of establishing driving connection between the crank arm and the bracket clamp 3 on the chassis frame B, so that when the brake A moves vertically under the action of the springs of the vehicle with which the device is to be used, thrust and pull will be transmitted from the bracket clamp 3 on the frame B to the crank 1. Owing to changes in the vertical projection at the end of crank 1, with its swinging motion about the center 1ᵇ, it is necessary that angular flexibility be provided for between the crank 1 and the rod 2, and preferably also between the rod 2 and the bracket clamp 3. This has heretofore been accomplished either by making the rod 2 inherently flexible, or by establishing metal bearings between the rod and the parts with which it is articulated. But both of these methods are objectionable, the former because lacking in endurance, and the latter because of expense in production, necessity for lubrication, etc. The present invention meets the operative conditions required in the articulation of the rod 2 with the members which it is to connect, by providing the member to be connected, for instance crank 1, with an apertured end 4 of larger diameter than the rod 2 so that when the rod is passed through the eye, the metal of the two members will be sufficiently apart to avoid any possibility of contact; and two blocks 5 of rubber or other suitable material having sufficient resiliency, compressibility or deformability to serve the purpose to be described, are placed around the rod on opposite sides of the eye 4 and preferably with reduced ends 5ª, faced with fabric 5ᵇ, and having dimensions which adapt them to be forced in between the wall of the eye of the end 4 and the rod 2, and thereby maintain the space between the members; and these blocks 5 are confined in the position stated by means of abutment disks 6 sustained upon the rod 2 by means of shoulders 7, one or both of which are in the form of nuts threaded upon the rod and therefore adapted to press the blocks against the apertured end 4, and insure the conditions stated as well as that of having the blocks under some degree of initial compression as suggested by their bulging sides, Figure 1, which causes them to conform tightly to the apertured end of the member, and avoid any material lost motion vibration, in the operation of the device. The reduced ends 5ª meet within the eye 4, but their combined length is greater than the depth of the eye, so that they too are compressed by the nuts 7 and caused to fill tightly the space between the rod and the wall of the eye.

Obviously, if the blocks 5 are of yielding material, the crank 1 may change its angular relation to the rod 2 while remaining under accurate control of said rod in the longitudinal direction of the rod.

As shown in elevation in Figure 1, blocks 5ˣ are in all respects similar to the blocks 5 shown in section, confined by means of abutments 6ˣ and nuts 7ˣ on opposite sides of the end 3ª of the bracket clamp 3, and may be employed for articulating the lower end of the rod 2 with absorption of shock, freedom of metal bearing, and exemption of lubricant and angular flexibility between the rod and bracket clamp, precisely as described with reference to the articulation of the rod 2 with the crank 1.

Crank 1 is preferably formed from a blank such as shown in Figure 3, wherein its end portions 4ª are bifurcated to provide the plies or laminæ 4 of the apertured end of the crank, said blank having its end portions folded upon diagonal lines 1ᵈ, into planes perpendicular to the body 1 to provide bracing flanges 1ᶜ and with the said end portions 4 deflected into parallelism as clearly indicated in section in Figure 1. This method of producing the crank arm affords a strong and light construction and one in which the free loading end of the crank is quite rigid and well adapted for articulation with the connecting rod in the manner herein described.

While I have enumerated at length the various characteristics of the preferred embodiment of my invention, and described in detail the structural conditions thereof, it is to be understood that my invention is not limited to the use of all of the identifying characteristics or structural features described, but may be realized to an advantageous degree with the use of less than all of its characteristic features and with other structural details, and is therefore to be measured by the terms of the sub-joined claims, rather than by the letter of the foregoing description.

I claim:

1. In a spring brake device having a load transmitting member and a connecting member, means for articulating said members consisting of an eye on one member through which the other member is inserted, and confining blocks mounted on the inserted member on opposite sides of said eye; said inserted member having freedom of angular movement in said eye, and said confining blocks permitting said angular movement while limiting longitudinal movement of said inserted member.

2. In a spring brake device having a load transmitting member and a connecting member, means for articulating said members consisting of an eye on one member through which the other member is inserted, and confining blocks mounted on the inserted member on opposite sides of said eye; the opening of the eye being substantially larger than the diameter of the inserted member, thereby permitting freedom of angular movement between the inserted member and the eye; said confining blocks being constructed to center the inserted member relatively to the eye; and said blocks being of compressible material and said inserted member having means for pressing said blocks against said eye.

3. In a spring brake of substantially the character described, a load transmitting member, a connecting rod member, and means for articulating said members consisting of an eye carried by one of the members and through which the other member is inserted, blocks of compressible material mounted upon the inserted member on opposite sides of said eye, and means carried by the inserted member for developing pressure against the blocks and in the direction of the eye; said inserted member being materially smaller than the eye through which it passes, thereby permitting relative angular movement between the inserted member and the transmitting member, and resilient material being introduced between the wall of the eye and the inserted member to center the inserted member while permitting its angular movement.

4. In a spring brake device having a load transmitting member and a connecting member, means for articulating said members consisting of an eye on one member through which the other member is inserted, confining blocks mounted on the inserted member on opposite sides of said eye, a block being constructed with a reduced portion which enters between the inserted member and the wall of the eye.

5. In a spring brake device having a load transmitting member and a connecting member, means for articulating said members consisting of an eye on one member through which the other member is inserted, and confining blocks mounted on the inserted member on opposite sides of said eye; said blocks being constructed with reduced portions extending between the inserted member and the wall of the eye, meeting within the eye and expanded to fill the space under the compression of the blocks.

6. In a device of the character described, a load transmitting member and connecting member and means for articulating said members; said means consisting of an eye formed on one member and through which the other member is inserted with freedom of angular movement relative to the loading member, blocks of compressible material surrounding the inserted member and located on opposite sides of the eye, abutment disks on the inserted member sustaining the ends of the blocks remote from the eye, and an adjusting nut threaded on the inserted member beyond the abutment disks adapted to compress the blocks through the disks and against the eye.

7. In a vehicle spring brake, a rotary frictional member and a crank arm in driving relation to said member; said crank arm consisting of a blank having a bifurcated end and having the end portions developed by its bifurcation, bent up from the plane of the body of the blank and constructed for articulation with a connecting member.

8. In a vehicle spring brake, a rotary frictional member, and a crank arm in driving relation to said member; said crank arm being constructed from a plate metal blank having its end bifurcated and having its portions defined by said bifurcation, bent up from the plane of the body of the blank, upon lines inclined rearwardly and outwardly from the bifurcation thereby providing stiffening flanges and an articulating end in a plane at a substantial angle to the plane of the body of the blank.

9. In a vehicle spring brake, a rotary frictional member, and a crank arm in driving relation to said member; said crank arm being constructed from a plate metal blank having its end bifurcated and having its portions defined by said bifurcation, bent up from the plane of the body of the blank, upon lines inclined rearwardly and outwardly from the bifurcation, thereby providing stiffening flanges and an articulating end in a plane at a substantial angle to the plane of the body of the blank; the upturned ends of the blank being apertured and brought into parallelism to provide an articulating eye.

10. A flexible non-metallic connection comprising an arm with an eye at one end adapted to receive loosely a rod, resilient means mounted on said rod and positioned on opposite sides of said arm, the extremities of said resilient means being immovable relative to and held by said rod, and having a portion in said eye filling the space between said arm and rod whereby a universal movement may be had.

11. A flexible non-metallic connection comprising a rod, a resilient body element having a narrow central portion and enlarged ends, an arm provided with an eye at one end which is adapted to receive the narrow portion of the resilient body element, said resilient body element being centrally bored lengthwise and mounted on said rod, its extremities being immovable relative to and held by said rod.

12. An adjustable flexible non-metallic connection comprising a rod having a resilient body, and retaining means mounted thereon, said retaining means being positioned on opposite sides of said resilient body, said resilient body having a narrow central portion and enlarged ends, an arm having an eye engaging the narrow portion of said resilient body to form a flexible connection between the arm and rod, the retaining means being capable of adjustment to place the resilient body under a predetermined initial compression to vary the flexibility of the connection.

Signed at Detroit, Mich., this 24th day of Aug., 1925.

MARK HARRIS.